(12) United States Patent
Ettorre et al.

(10) Patent No.: US 10,981,662 B2
(45) Date of Patent: Apr. 20, 2021

(54) SYSTEM AND METHOD FOR DETERMINING MINIMUM PITCH AND MINIMUM GAS GENERATOR IDLE CONDITION

(71) Applicant: GE AVIO SRL, Rivalta di Torino (IT)

(72) Inventors: Stefano Ettorre, Bari (IT); Felice Felippone, Rivalta di Torino (IT); Simone Castellani, Rivalta di Torino (IT)

(73) Assignee: GE AVIO SRL, Rivalta di Torino (IT)

( * ) Notice: Subject to any disclaimer, the term of this patent is extended or adjusted under 35 U.S.C. 154(b) by 274 days.

(21) Appl. No.: 16/019,887

(22) Filed: Jun. 27, 2018

(65) Prior Publication Data
US 2019/0031360 A1 Jan. 31, 2019

(30) Foreign Application Priority Data
Jul. 28, 2017 (EP) .................................. 17425083

(51) Int. Cl.
*B64D 31/06* (2006.01)
*B64C 11/34* (2006.01)
(Continued)

(52) U.S. Cl.
CPC .............. *B64D 31/06* (2013.01); *B64C 11/34* (2013.01); *B64D 27/10* (2013.01); *B64D 31/04* (2013.01)

(58) Field of Classification Search
CPC ........ B64D 31/06; B64D 27/10; B64D 31/04; B64C 11/34; F02C 9/00; F05D 2270/02;
(Continued)

(56) References Cited

U.S. PATENT DOCUMENTS 2,978,034 A 4/1961 Wente
4,019,702 A * 4/1977 Annin .................. G05D 1/0661
244/182
(Continued)

FOREIGN PATENT DOCUMENTS

EP 3147220 A1 3/2017
WO WO93/06354 4/1993
(Continued)

OTHER PUBLICATIONS

European Search Report Corresponding to Application No. 17425083 dated Jan. 26, 2018.
(Continued)

*Primary Examiner* — Fadey S. Jabr
*Assistant Examiner* — Mohamed Abdo Algehaim
(74) *Attorney, Agent, or Firm* — Dority & Manning, P.A.

(57) ABSTRACT

The present disclosure is directed to a method for determining an aircraft minimum low pitch setting for a propeller assembly and minimum gas generator idle speed for a gas generator, in which the propeller assembly and the gas generator together comprise a gas turbine engine. The method comprises determining, via one or more controllers, an operating condition of the aircraft based at least on a weight on wheels (WoW) signal and a throttle lever position. The WoW signal produces a first mode or a second mode different from the first mode, and the throttle lever position defines at least a takeoff position and an idle power position.

17 Claims, 11 Drawing Sheets

(51) Int. Cl.
*B64D 27/10* (2006.01)
*B64D 31/04* (2006.01)

(58) Field of Classification Search
CPC .... G05D 1/0202; G05D 1/042; G05D 1/0646;
G05D 1/0653; G05D 1/0661; G05D
1/0669; G05D 1/06765; G05D 1/0684;
G08G 5/00
USPC ............................................................ 701/3
See application file for complete search history.

(56) References Cited

U.S. PATENT DOCUMENTS

| | | | |
|---|---|---|---|
| 4,468,924 A * | 9/1984 | Moore | F02C 9/28 60/226.1 |
| 4,648,798 A * | 3/1987 | Voisard | B64C 11/38 416/154 |
| 4,958,289 A * | 9/1990 | Sum | B64C 11/305 416/27 |
| 5,061,153 A | 10/1991 | Pace et al. | |
| 5,315,819 A * | 5/1994 | Page | F02C 9/28 416/30 |
| 6,880,784 B1 * | 4/2005 | Wilkinson | B64D 31/06 244/76 R |
| 8,651,811 B2 | 2/2014 | Danielson | |
| 8,682,562 B2 | 3/2014 | Shepler | |
| 8,918,264 B2 | 12/2014 | Jegu et al. | |
| 8,965,657 B2 * | 2/2015 | Georgin | B60T 8/1703 701/79 |
| 9,193,476 B2 | 11/2015 | Cottet et al. | |
| 9,488,054 B2 | 11/2016 | Corpron | |
| 9,528,385 B2 | 12/2016 | Payne | |
| 2011/0208400 A1 * | 8/2011 | Lickfold | B64D 31/06 701/100 |
| 2013/0199198 A1 * | 8/2013 | Corpron | B64D 31/00 60/773 |
| 2013/0325221 A1 * | 12/2013 | Shue | B64C 13/04 701/16 |
| 2013/0327014 A1 * | 12/2013 | Moulebhar | F02K 3/065 60/226.2 |
| 2013/0338856 A1 * | 12/2013 | Yelland | B64C 13/18 701/2 |
| 2015/0375853 A1 | 12/2015 | Kawalkar | |
| 2016/0229547 A1 | 8/2016 | Fisher et al. | |
| 2016/0326984 A1 * | 11/2016 | Marcos | F02K 1/09 |
| 2017/0081038 A1 * | 3/2017 | Looper | B64D 31/04 |
| 2019/0016443 A1 * | 1/2019 | Alfred | B64C 13/503 |
| 2019/0047714 A1 * | 2/2019 | Looper | B64D 27/10 |
| 2020/0182160 A1 * | 6/2020 | Corpron | B64D 27/10 |

FOREIGN PATENT DOCUMENTS

WO WO2005/065071 A1 7/2005
WO WO2015/053930 A1 4/2015

OTHER PUBLICATIONS

Canadian Office Action Corresponding to Application No. 3011845 dated May 7, 2019.
Canadian Office Action Corresponding to Application No. 3011845 dated Dec. 11, 2019.

* cited by examiner

SYSTEM AND METHOD FOR DETERMINING MINIMUM PITCH AND MINIMUM GAS GENERATOR IDLE CONDITION

FIELD

The present subject matter relates generally to gas turbine engines used for aircraft.

BACKGROUND

Gas turbine engines, such as turboprop engines, generally include at least two operator manipulated input devices; a power lever for controlling a commanded power output of the engine, a condition lever for controlling fuel cut-off and manually setting a ground idle or flight idle setting of the gas turbine engine, and a propeller lever for controlling propeller pitch angle (i.e., feathering) and propeller speed. During ground conditions, it is generally desired to minimize thrust to mitigate aircraft brake usage and minimize fuel consumption. This is accomplished via manual controls and adjustments to the plurality of operator manipulated input devices.

In some engines, only a single idle setting is available, such as flight idle, which delivers more thrust at a ground condition than at a ground idle condition, thereby increasing brake usage and fuel consumption. An operator must therefore either manually adjust the propeller pitch angle to reduce delivered thrust, further apply the brakes, or both to control the aircraft. The operator may further be required to operate the engine higher than idle while modulating the brakes in order to mitigate operating the propeller at an avoid band at which excessive wear and deterioration may occur due to undesired vibratory modes. Therefore, under a plurality of conditions, an operator must modulate a plurality of input devices based on a plurality of conditions to achieve one or more desired outcomes.

As such, there is a need for a system and method of determining minimum pitch and minimum gas generator idle condition for a gas turbine engine that may improve ground operation of the aircraft, mitigate operation of the propeller in an avoid band, improve fuel consumption, and generally improve operation of the aircraft and gas turbine engine.

BRIEF DESCRIPTION

Aspects and advantages of the invention will be set forth in part in the following description, or can be apparent from the description, or can be learned through practice of the invention.

The present disclosure is directed to a system for setting an aircraft minimum pitch angle and minimum gas generator idle speed. The system includes one or more sensors providing a weight on wheels (WoW) signal, a gas generator rotational speed or output torque, and one or more controllers including one or more processors and one or more memory devices. The one or more memory devices stores instructions that when executed by the one or more processors cause the one or more processors to perform operations. The operations include receiving, via one or more sensors, a weight on wheels (WoW) signal defining a first mode and a second mode different from the first mode; receiving, via an operator manipulated input device, a throttle lever position defining at least an idle position and a takeoff position; determining, via one or more controllers, an operating condition of the aircraft based at least on the WoW signal and the throttle lever position, wherein each operating condition defines a low pitch setting (LPS) of the propeller assembly and an idle condition of the gas generator, the operating condition defining a ground condition defining a ground LPS and a ground idle condition, a takeoff condition defining a flight LPS and the ground idle condition, a flight condition defining the flight LPS and the flight idle condition, and a landing condition defining the ground LPS and the flight idle condition, and wherein the WoW signal produces a first mode or a second mode different from the first mode.

In various embodiments, the operations further include monitoring, via one or more sensors, a change in the WoW signal and a change in the throttle lever position; and adjusting the operating condition based on the change in one or more of the WoW signal and the throttle lever position.

In one embodiment, the operations further include starting a first timer following a change in throttle lever position to the takeoff position and if the WoW signal is in the first mode; and adjusting the operating condition to the takeoff condition if the first timer reaches a first time threshold.

In various embodiments, the operations further include starting a second timer following a change in the WoW signal from the second mode to the first mode; adjusting the operating condition from the flight condition to the landing condition if the second timer reaches a second time threshold and the throttle lever position is less than the takeoff position and greater than or equal to the idle power position; and adjusting the operating condition from the flight condition to the ground condition if the throttle lever position is less than the idle power position.

In one embodiment, the operations further include adjusting the operating condition from the landing condition to the ground condition if the throttle lever position is less than the idle power position; and adjusting the operating condition from the landing condition to the flight condition if the WoW signal is at the second mode at a third time threshold.

In another embodiment, the operations further include starting a first timer if the WoW signal is at the first mode at a third time threshold and the throttle lever position is at the takeoff position; and adjusting the operating condition from the landing condition to the flight condition if the WoW signal is at the second mode at a first time threshold.

In various embodiments, the operations further include resetting all timers preceding a change to the ground condition or the flight condition.

In still various embodiments, adjusting the operating condition includes adjusting the minimum pitch angle to the flight LPS or the ground LPS and adjusting the minimum gas generator idle speed to the ground idle condition or the flight idle condition.

In one embodiment, the flight LPS defines a minimum pitch angle greater than the minimum pitch angle of the ground LPS, in which the flight idle condition defines a minimum gas generator idle speed greater than the minimum gas generator idle speed of the ground idle condition.

The present disclosure is further directed to a method for determining an aircraft minimum low pitch setting for a propeller assembly and minimum gas generator idle speed for a gas generator, in which the propeller assembly and the gas generator together comprise a gas turbine engine. The method includes determining, via one or more controllers, an operating condition of the aircraft based at least on a weight on wheels (WoW) signal and a throttle lever position, wherein the WoW signal produces a first mode or a second mode different from the first mode, and the throttle lever position defines at least a takeoff position and an idle power position.

In various embodiments, determining the operating condition includes determining, via one or more controllers, an idle condition of the gas generator based at least on the WoW signal and a throttle lever position; and determining, via one or more controllers, a low pitch setting (LPS) of the propeller assembly based at least on the WoW signal and the throttle lever position.

In one embodiment, determining the idle condition of the gas generator includes setting a ground idle condition or a flight idle condition of the gas generator based at least on the WoW signal and the throttle lever position.

In another embodiment, in determining the idle condition of the gas generator, the ground idle condition is set when the WoW signal produces the first mode and the throttle lever position is below the idle power position.

In yet another embodiment, in determining the idle condition of the gas generator, the flight idle condition is set when the WoW signal produces the second mode.

In still another embodiment, determining a LPS of the propeller assembly includes setting a ground LPS or a flight LPS based at least on the WoW signal and the throttle lever position.

In still yet another embodiment, in determining the LPS of the propeller assembly, the ground LPS is set when the WoW signal produces the first mode.

In one embodiment, in determining the LPS of the propeller assembly, the flight LPS is set when the WoW signal produces the second mode and the throttle lever position is greater than or equal to the idle power position.

In various embodiments, the method further includes monitoring a change in WoW signal and the throttle lever position, wherein a change in WoW signal or the throttle lever position is indicative of a change in operating condition of the aircraft.

In one embodiment, in determining the LPS, the WoW signal at the first mode while the throttle lever position is greater than or equal to the idle power position and less than the takeoff position sets the LPS from a flight LPS condition to a ground LPS condition.

In another embodiment, in determining the LPS, the throttle lever position at the takeoff position sets the LPS from a ground LPS condition to a flight LPS condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
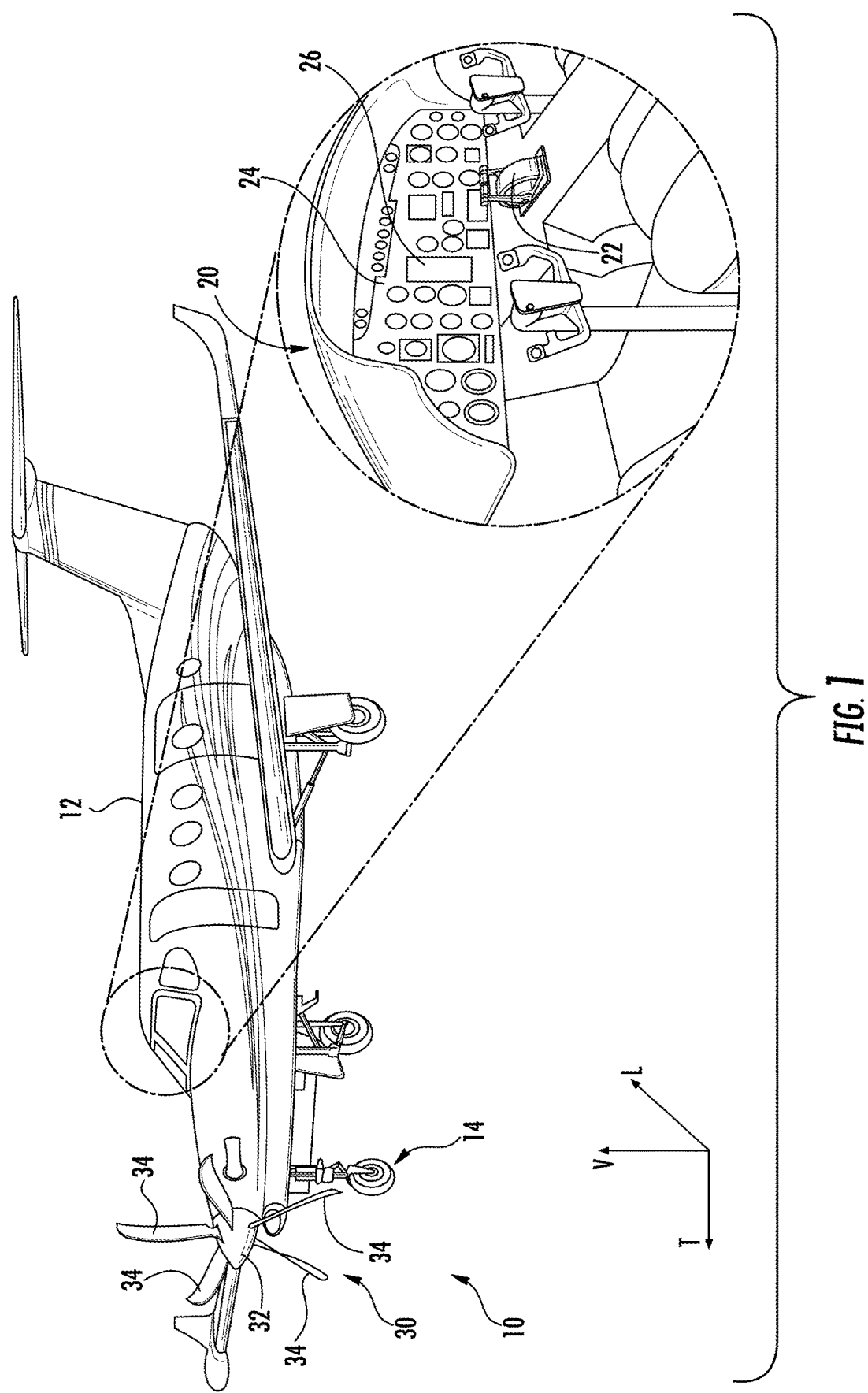
FIG. 1 illustrates a perspective view of an aircraft according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", "third", "fourth", and "fifth" can be used interchangeably to distinguish one component from another and are not intended to signify location or importance of the individual components. In addition, the term "restore" means returning a signal or logic to a former condition or original state.

Embodiments of systems and methods of determining minimum pitch and gas generator idle condition for a gas turbine engine are generally provided. The systems and methods provided herein may improve ground operation of the aircraft, mitigate operation of the propeller in an avoid band, improve fuel consumption, and generally improve operation of the aircraft and gas turbine engine. The systems and methods provided herein may further be implemented using a single operator manipulated input device, such as a throttle or power lever. The systems and methods may further enable safe or failsafe operation of the aircraft and engine based on one or more operating conditions and inputs to aircraft and engine.

Referring now to the drawings, FIG. 1 provides a perspective view of an exemplary aircraft 10 in accordance with example embodiments of the present disclosure. The aircraft 10 defines an orthogonal coordinate system, including three orthogonal coordinate axes. In particular, the three orthogonal coordinate axes include a lateral axis L, a longitudinal axis T, and a vertical axis V. In operation, the aircraft 10 can move along at least one of the lateral axis L, the longitudinal axis T, and the vertical axis V.

Figure 3:
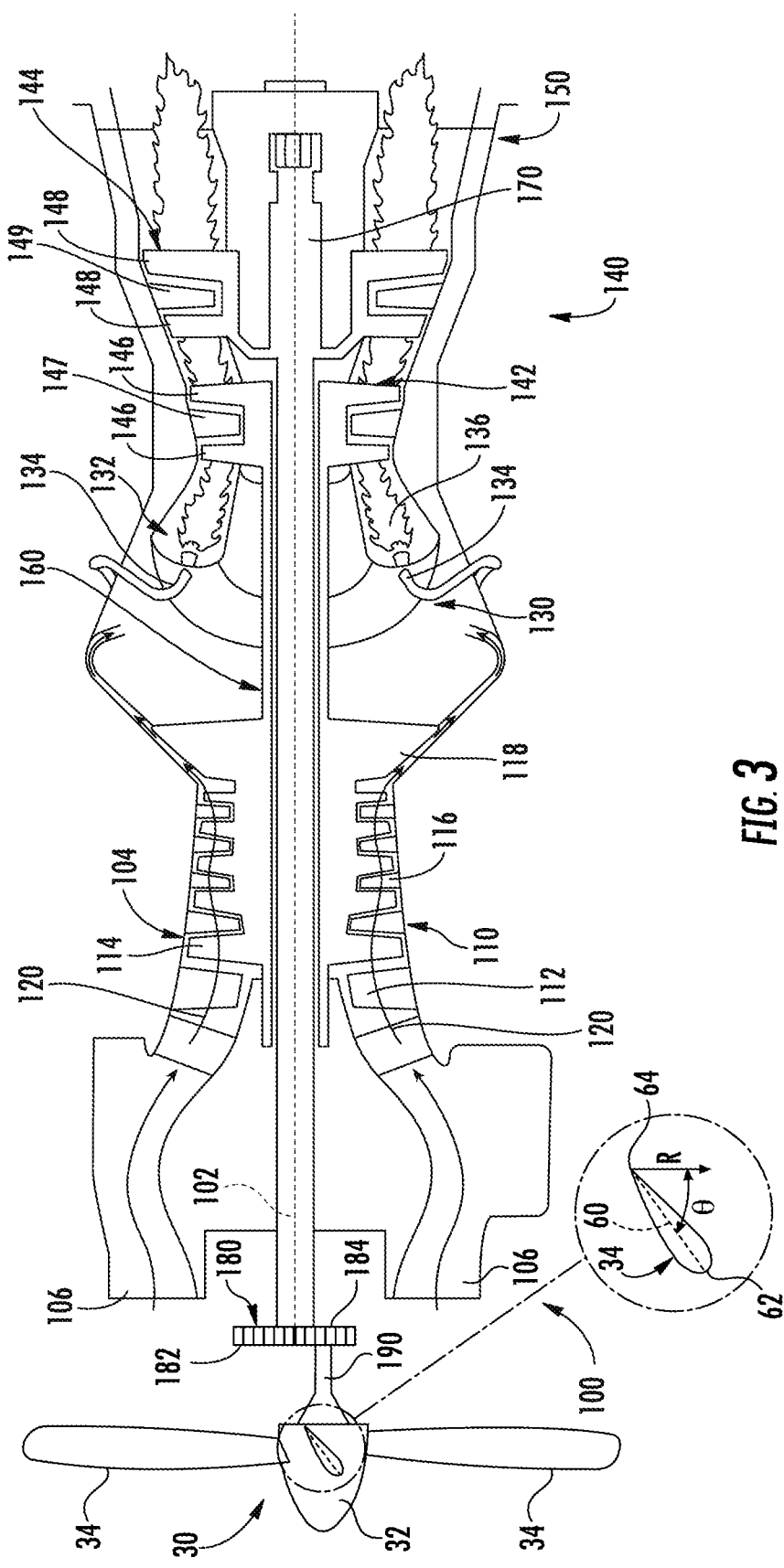
FIG. 3 illustrates a schematic cross-sectional view of a gas turbine engine according to example embodiments of the present disclosure.

In the example embodiment of FIG. 1, the aircraft 10 includes an airframe 12 defining a cockpit 20. The cockpit 20 includes a throttle input device 22 and an instrument control panel 24 having a display 26. The aircraft 10 further includes a propeller assembly 30 comprising a hub 32 and a plurality of blades 34 extending outwardly from the hub 32. Additionally, the aircraft 10 includes a gas generator 100 (FIG. 3). The gas generator 100 generates and transmits power to drive rotation of the propeller assembly 30. In particular, rotation of the propeller assembly 30 generates thrust for the aircraft 10.

Figure 2:
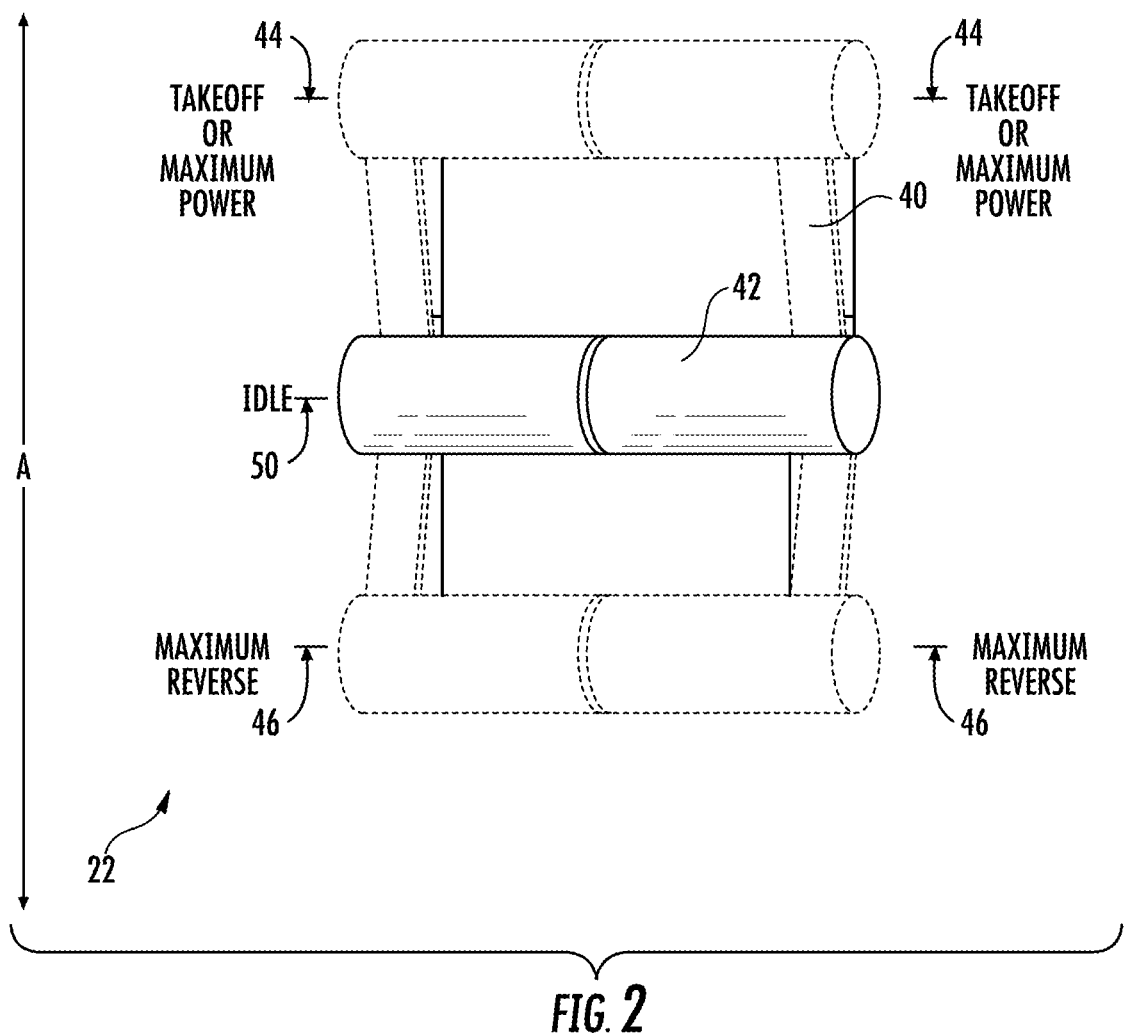
FIG. 2 illustrates a top-down view of a throttle input device according to example embodiments of the present disclosure.

Referring now to FIG. 2, the throttle input device 22 controls engine power of the gas generator 100. Furthermore, the throttle input device 22 (e.g., defining a power level angle or PLA, or thrust level angle TLA, etc.) is more generally an operator manipulated input device. Additionally, the throttle input device 22 controls a minimum propeller pitch angle or low pitch setting (LPS) and a minimum gas generator idle condition based on a position of the throttle input device 22. In the embodiment depicted, the throttle input device 22 defines an axial direction A, and the throttle input device 22 includes a lever 40 having a handle 42. As shown, the lever 40 is movable between one or more throttle lever positions, such as a first position 44 and a second position 46 along the axial direction A. Accordingly, moving the lever 40 to the first position 44 increases thrust of the aircraft 10 (FIG. 1) in a first direction along the longitudinal axis T. In contrast, moving the lever 40 to the second position 46 increases thrust of the aircraft 10 in a second direction along the longitudinal axis T. It should be appreciated that the first direction is opposite the second direction along the longitudinal axis T.

In the example embodiment depicted, the first position 44 corresponds to a TAKEOFF or MAXIMUM POWER setting (hereinafter referred to as "TAKEOFF" or "TO") of the gas generator 100, and the second position 46 corresponds to a MAXIMUM REVERSE setting of the gas generator 100. In addition, the throttle input device 22 includes one or more of intermediate third positions 50 disposed between the first and second positions 44, 46. More specifically, the intermediate third positions 50 can include an IDLE position.

Referring now to FIG. 3, the gas generator 100 defines a longitudinal or centerline axis 102 extending therethrough for reference. The gas generator 100 can generally include a substantially tubular outer casing 104 that defines an annular inlet 106. The outer casing 104 can be formed from a single casing or multiple casings. The outer casing 104 encloses, in serial flow relationship, a gas generator compressor 110, a combustion section 130, a turbine section 140, and an exhaust section 150. The gas generator compressor 110 includes an annular array of inlet guide vanes 112, one or more sequential stages of compressor blades 114, one or more sequential stages of stationary and/or variable guide vanes 116, and a centrifugal compressor 118. Collectively, the compressor blades 114, vanes 116, and the centrifugal compressor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the compressor 110 and the turbine section 140.

The turbine section 140 includes a gas generator turbine 142 and a power turbine 144. The gas generator turbine 142 includes one or more sequential stages of turbine rotor blades 146 and one or more sequential stages of stator vanes 147. Likewise, the power turbine 144 includes one or more sequential stages of turbine rotor blades 148 and one or more sequential stages of stator vanes 149. Additionally, the gas generator turbine 142 drives the gas generator compressor 110 via a gas generator shaft 160, and the power turbine 144 drives the propeller assembly 30 via a power turbine shaft 170.

More specifically, as shown in the embodiment illustrated in FIG. 3, the gas generator compressor 110 and the gas generator turbine 142 are coupled to one another via the gas generator shaft 160, and the power turbine 144 and the propeller assembly 30 are coupled to one another via the power turbine shaft 170. In operation, the combustion gases 136 drive both the gas generator turbine 142 and the power turbine 144. As the gas generator turbine 142 rotates around the centerline axis 102, the gas generator compressor 110 and the gas generator shaft 160 both also rotate around the centerline axis 102. Further, as the power turbine 144 rotates, the power turbine shaft 170 rotates and transfers rotational energy to the propeller assembly 30 through a gear train 180. More specifically, the gear train 180 can include a first gear 182 and a second gear 184 in mesh with the first 182. The first gear 182 can be connected to the power turbine shaft 170, and the second gear 184 can be connected to a propeller shaft 190. In operation, the gear train 180 can step-down a rotational speed $N_P$ of the power turbine shaft 170. Accordingly, a rotational speed NR of the propeller shaft 190 can be less than the rotational speed $N_P$ of the power turbine shaft 170.

As shown, the propeller assembly 30 can be rotatably coupled to the propeller shaft 190, and the plurality of blades 34 can be rotatable about a direction R. In addition, each blade of the plurality of blades 34 defines a pitch angle θ between the direction R and a chord 60 extending between leading and trailing edges 62, 64 of each blade. The propeller assembly 30 defines a low pitch setting (LPS) defining a first minimum pitch angle θ and a second minimum pitch angle θ, each based on an operating condition of the aircraft 10 including the gas generator 100. The propeller assembly 30 defines a ground LPS at the first minimum pitch angle θ and a flight LPS at the second minimum pitch angle θ greater than the first minimum pitch angle θ.

The ground LPS defines the first minimum pitch angle θ such that a minimal thrust is exerted at that pitch angle θ when the aircraft is at a ground condition or landing condition, each as indicated by a weight on wheels (WoW) signal in a first mode indicating that the aircraft 10 is on the ground (e.g., WoW signal is TRUE), thereby minimizing or eliminating usage of brakes, improving fuel efficiency, and keeping the propeller assembly 30 out of an avoid band of operation that may adversely affect gas generator 100 or aircraft 10 operation, or both.

The flight LPS defines the second minimum pitch angle θ such that a minimal thrust is exerted at that pitch angle θ when the aircraft is at a flight condition or takeoff condition, each as indicated by the WoW signal in a second mode indicating that the aircraft 10 is off of the ground (e.g., the WoW signal is FALSE), thereby establishing a greater minimum pitch angle θ that may mitigate the risk of applying reverse thrust (e.g., MAXIMUM REVERSE). The greater minimum pitch angle θ defined by the flight LPS at the second minimum pitch angle θ may further enable quicker or more expedient changes in operating condition since the minimum pitch angle θ at the flight LPS is greater than at the ground LPS.

Figure 4:
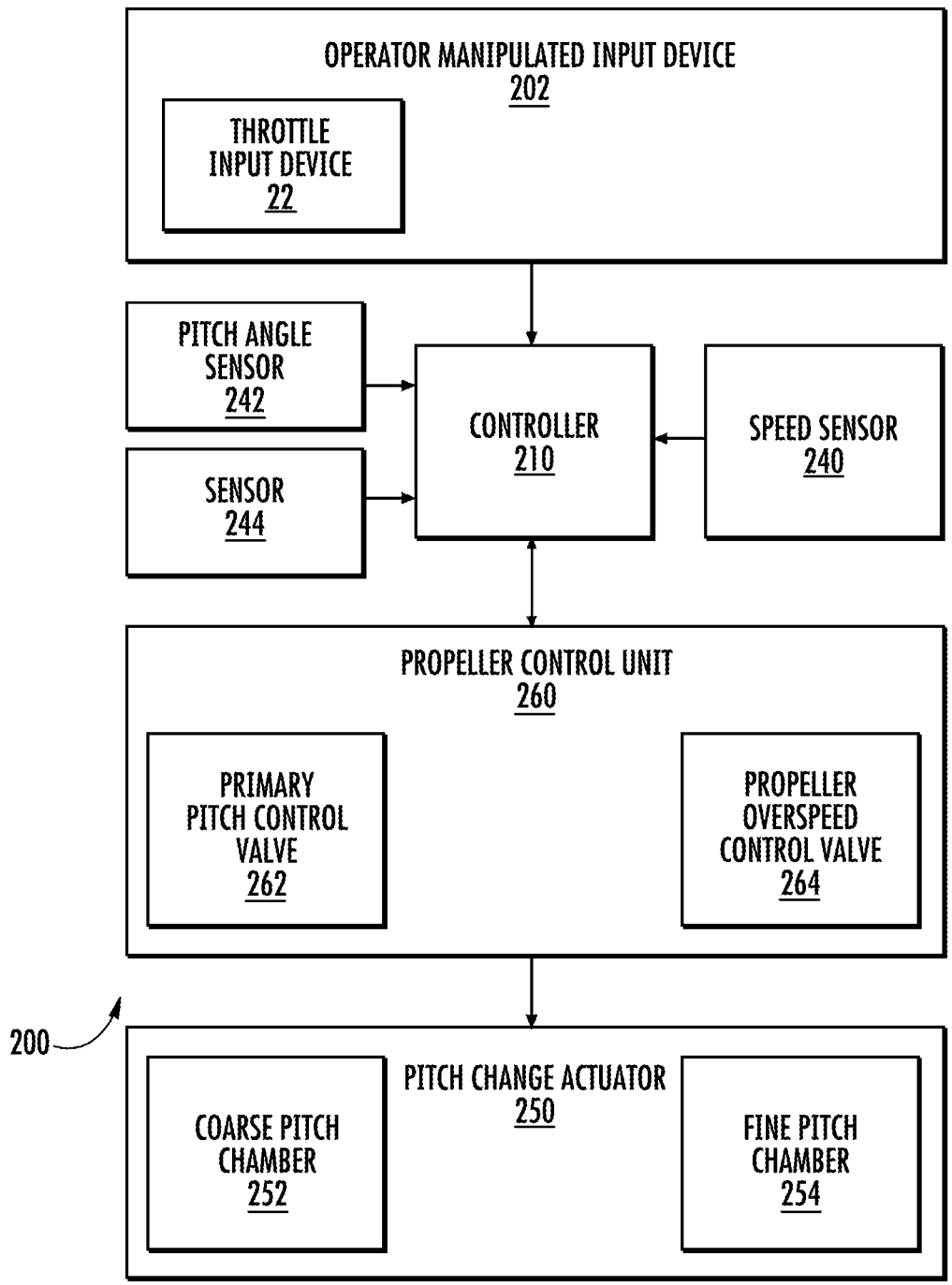
FIG. 4 illustrates a schematic view of a system for control logic for a propeller according to example embodiments of the present disclosure.

Referring now to FIG. 4, an example embodiment of a system 200 for setting a minimum pitch angle setting for the propeller assembly 30 and a minimum gas generator idle speed for the gas generator 100 of the aircraft 10 is illustrated in accordance with aspects of the present disclosure. In general, the system 200 will be described with reference to the aircraft 10, the throttle input device 22, and the gas generator 100 described above with reference to FIGS. 1, 2 and 3, respectively. However, in other embodiments, the system 200 can be implemented or used in association with any other suitable aircraft 10 or throttle input device 22.

As shown in FIG. 4, the system 200 can include an operator manipulated input device 202. In one embodiment, the operator manipulated device 202 can include the throttle input device 22 (FIG. 1). As will be discussed below in more detail, an operator of the aircraft 10 can use the operator manipulated input device 202, or more specifically, the single throttle input device 22 relative to each gas generator 100, to set a minimum pitch angle θ of the propeller assembly 30 (FIG. 1) and a minimum idle speed of the gas generator 100 (FIG. 3) based on an operating condition of the aircraft 10 as outlined in FIG. 6.

Figure 5:
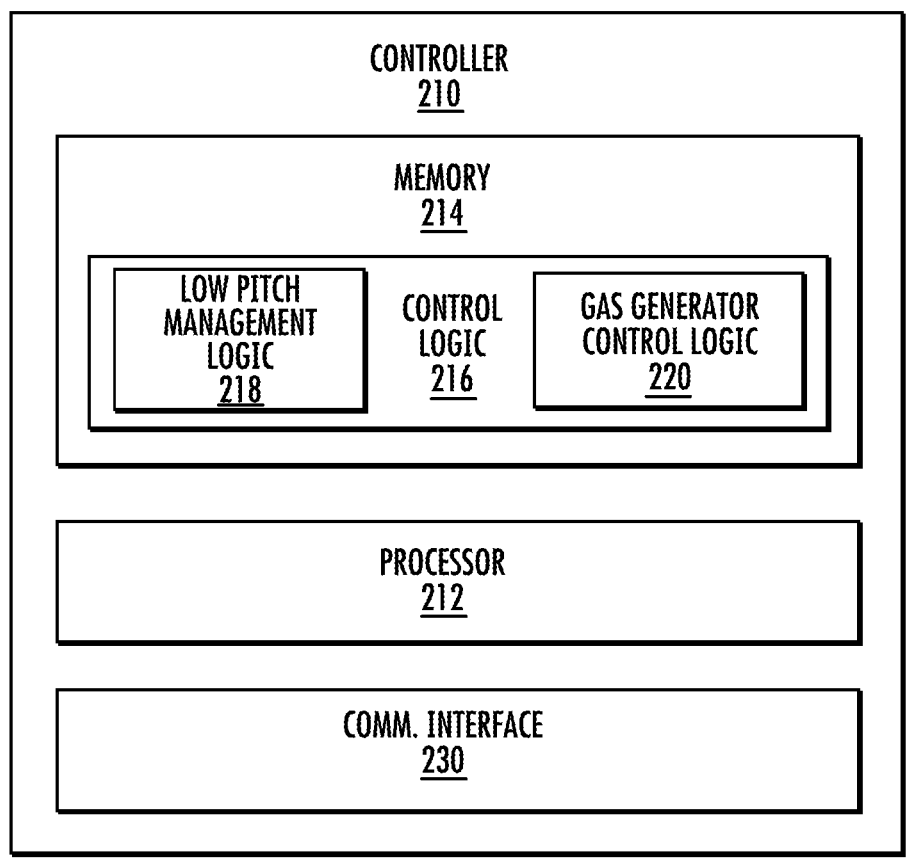
FIG. 5 illustrates a block diagram of one embodiment of a controller according to example embodiments of the present disclosure.

The system 200 can also include a controller 210. In general, the controller 210 can correspond to any suitable processor-based device, including one or more computing devices. For instance, FIG. 5 illustrates one embodiment of suitable components that can be included within the controller 210. As shown in FIG. 5, the controller 210 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 can include control logic 216 stored in memory 214. In addition, the control logic 216 can include low pitch management logic 218 and gas generator control logic 220. The low pitch management logic 218, when executed, can configure the controller 210 to maintain or change the minimum pitch angle θ of the blades 34 to the ground LPS or to the flight LPS based on the operating condition of the aircraft 10. The operating condition of the aircraft is based at least on the WoW signal in the first mode or the second mode and a throttle lever position (as shown and described in regard to FIG. 2). The gas generator control logic 220, when executed, can configure the controller 210 to maintain or change the minimum gas generator idle speed or power output from a ground idle setting to a flight idle setting based on the operating condition of the aircraft 10.

Additionally, as shown in FIG. 5, the controller 210 can also include a communications interface module 230. In several embodiments, the communications interface module 230 can include associated electronic circuitry that is used to send and receive data. As such, the communications interface module 230 of the controller 210 can be used to receive data from the operator manipulated input device 202. In addition, the communications interface module 230 can also be used to communicate with any other suitable components of the gas generator 100, including any number of sensors configured to monitor one or more operating parameters of the gas generator 100 and/or the propeller assembly 30. It should be appreciated that the communications interface module 230 can be any combination of suitable wired and/or wireless communications interfaces and, thus, can be communicatively coupled to one or more components of the gas generator 100 via a wired and/or wireless connection.

Referring again to FIG. 4, the system 200 includes a speed sensor 240 operable to detect the rotational speed of the gas generator 100. In one example embodiment, the output sensor 240 can be configured to sense the rotational speed $N_P$ of the power turbine shaft 170. In another example embodiment, the output sensor 240 can be configured to sense the rotational speed NR of the propeller shaft 190.

The system 200 can also include a pitch angle sensor 242 operable to detect the pitch angle θ of each blade of the plurality of blades 34. It should be appreciated that both the output sensor 240 and the pitch angle sensor 242 can be communicatively coupled to the controller 210 via any suitable wired or wireless connection.

Figure 6:
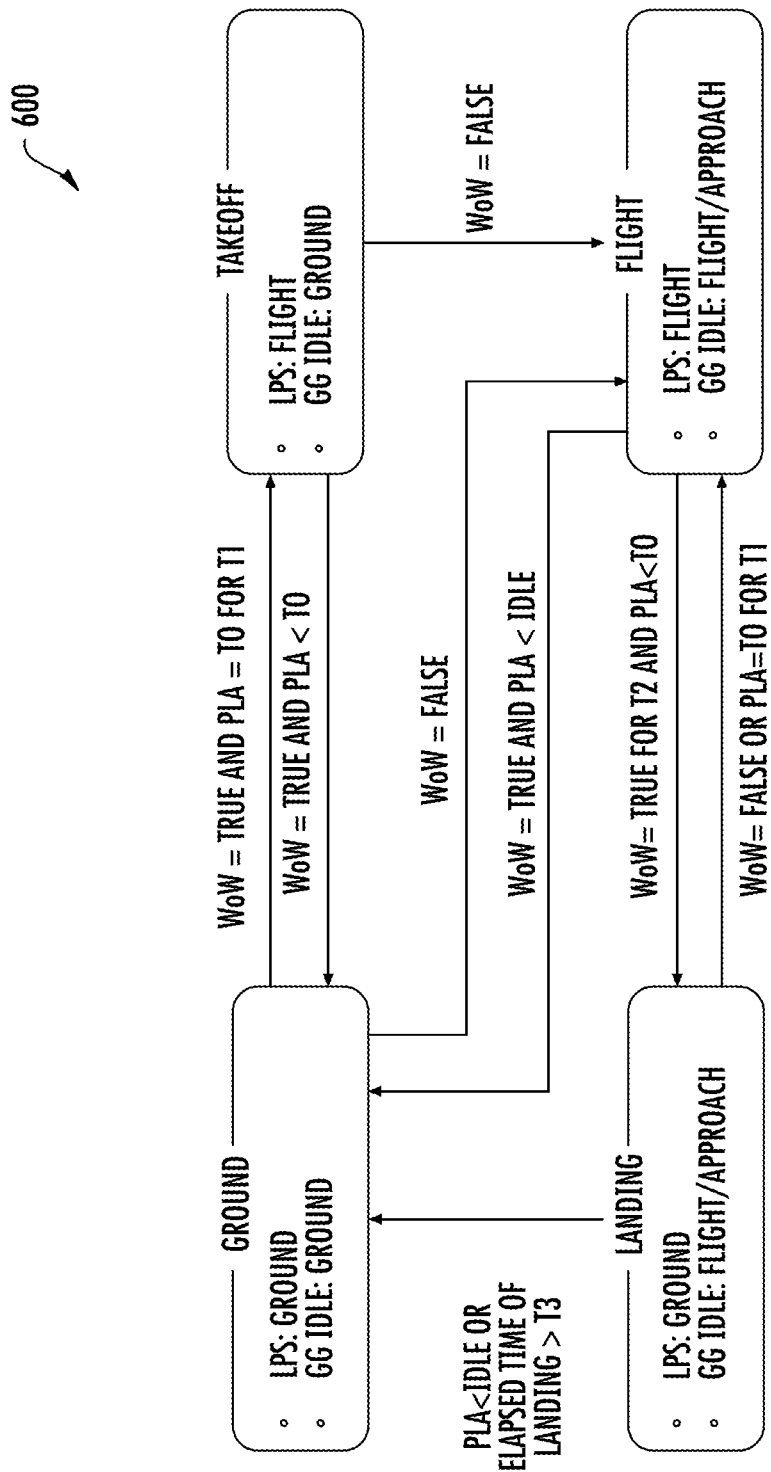
FIG. 6 illustrates an exemplary flowchart outlining operating conditions of the aircraft according to an embodiment of the present disclosure.

Referring now to FIG. 6, a flowchart 600 outlining exemplary operating conditions of an aircraft with a gas generator and pitch-change mechanism (e.g., aircraft 10, gas generator 100, and propeller assembly 30 generally provided in FIGS. 1-5) is generally provided. More specifically, the flowchart 600 outlines operating conditions, and changes therein, that may be controlled via a single operator manipulated input device (e.g., operator manipulated input device 202), such as the throttle input device 22 providing a throttle lever position, such as a power lever angle (PLA). The PLA generally corresponds to one or more output responses of the gas generator 100 and propeller assembly 30, including at least a desired output power (e.g., propeller speed and torque) and rotational speed of the gas generator 100, a minimum idle condition of the gas generator 100, and a low pitch setting (LPS) or minimum pitch angle θ of the propeller assembly 30.

Referring now to FIGS. 4-6, the system 200 can also include a sensor 244 operable to detect whether the aircraft 10 is operating in a FLIGHT condition versus a GROUND condition. In the FLIGHT condition, wheels 14 (FIG. 1) of the aircraft 10 do not support the weight of the airframe 12 (i.e., the sensor 244, defining a weight on wheels (WoW) sensor produces a second mode or FALSE response). In contrast, when the aircraft 10 is operating in the GROUND condition, the wheels 14 of the aircraft 10 do support the weight of the airframe 12 (i.e., the sensor 244 produces a first mode or TRUE response).

The flowchart 600 further defines intermediate or transitory conditions in which the aircraft 10 transitions from the GROUND condition to the TAKEOFF condition, or from the TAKEOFF condition to the FLIGHT condition, or from the FLIGHT condition to the LANDING condition, or from the LANDING condition to the GROUND condition, or reversions back to one or another condition. The intermediate transitory conditions may be based at least on the sensor 244 output and a throttle lever position of the operator manipulated input device 202. For example, the sensor 244 may output a first mode (e.g., TRUE) or a second mode (e.g., FALSE) indicating whether the aircraft 10 is on the ground (e.g., at rest, taxi, landing touchdown, takeoff) or in flight (e.g., takeoff roll, flight, landing approach), respectively.

Referring still to FIGS. 4-6, each operating condition defines a low pitch setting (LPS) of the propeller assembly 30 and a minimum ground idle condition of the gas generator 100. As previously described, the system 200 defines the ground LPS and the flight LPS. The system 200 further defines a ground idle minimum gas generator idle condition and a flight idle minimum gas generator idle condition. The ground idle condition minimizes thrust, brake usage, fuel consumption, wear, and deterioration of the aircraft 100 while further operating the propeller assembly 30 outside of an avoid band, in which the avoid band is a speed range of propeller operation that may result in undesired vibratory modes that may induce wear or damage on the propeller assembly 30, the gas generator 100, or aircraft 10.

Figure 7:
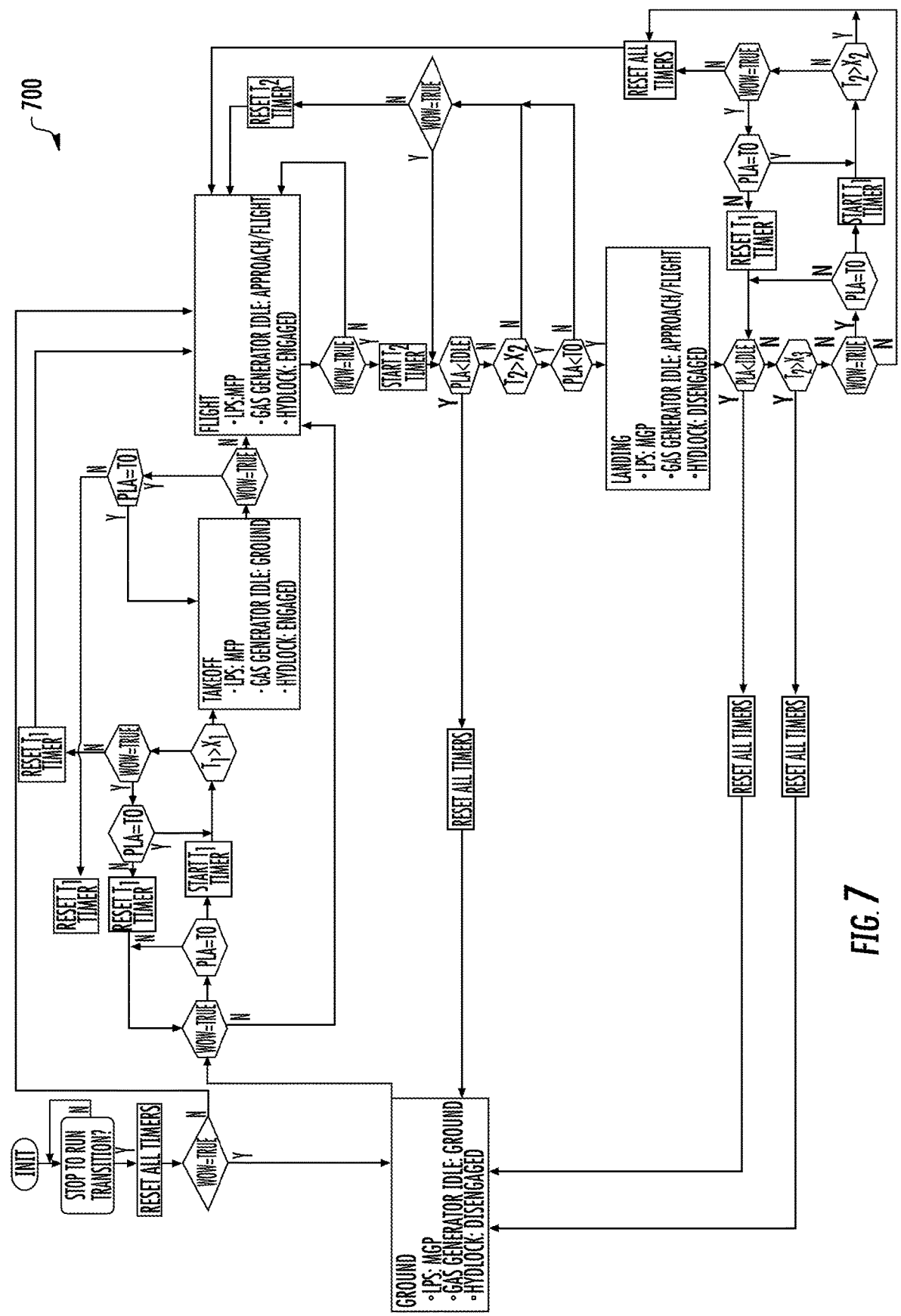
FIG. 7 illustrates an exemplary flowchart outlining a control logic of the engine according to an embodiment of the present disclosure.

Referring now to FIG. 7, an exemplary flowchart 700 outlining the control logic 216 of the controller 210 (provided in FIGS. 4-5) is generally provided. The exemplary flowchart 700 generally provided in FIG. 7 may be implemented in the aircraft 100 including the gas generator 100 and the propeller assembly 30 defining a pitch-change mechanism. The flowchart 700 may be executed in the engine, or more specifically engine controller, defining a single operator manipulated input device, such as a single throttle input device 22, or a single throttle input device 22 per gas generator 100 and propeller assembly 30, and based at least on aircraft signals (e.g., the WoW sensor and throttle lever position) such as to provide a single control of a minimum low pitch setting of the propeller assembly 30 and a minimum idle speed of the gas generator 100 based on operating conditions defined and described in regard to FIG. 6.

Referring now to FIGS. 1-7, when the aircraft 100 is in the GROUND condition, the minimum gas generator idle condition (shown as GG IDLE on FIG. 6 or "Gas Generator Idle" on FIG. 7) is set to ground idle and the LPS is set to ground LPS (shown as minimum ground pitch or "MGP" in FIG. 7). In one embodiment, the throttle lever 22 may modulate within any condition less than TAKEOFF (e.g., from the MAXIMUM REVERSE to just below TAKEOFF). In other embodiments, the throttle lever 22 may be modulated to the TAKEOFF condition and maintain the GROUND condition until a period of time has elapsed.

After the period of time has elapsed with the throttle lever position at TAKEOFF, and with the sensor 244 indicating the WoW in the first mode (e.g., TRUE), the operating condition changes from the GROUND condition to the TAKEOFF condition. The TAKEOFF condition defines the minimum gas generator idle condition still at ground idle while the LPS is set to flight LPS (shown as minimum flight pitch or "MFP" in FIG. 7). Setting the aircraft 100 to the flight LPS during the TAKEOFF condition enables protecting against setting an excessively low pitch of the propeller assembly 30 while operating the gas generator 100 at the TAKEOFF condition, thereby ensuring the propeller assembly 30 is at least pitched to enable successful takeoff of the aircraft 100. However, setting the minimum gas generator idle condition to ground idle enables relatively rapid abortion of takeoff by enabling the lower ground idle minimum gas generator idle condition versus the flight idle condition.

When the throttle lever is re-positioned below the TAKEOFF setting (i.e., a lesser power output of the gas generator) then the aircraft 100 changes from the TAKEOFF condition to the GROUND condition.

When the aircraft 100 has detached from the ground, the sensor 244 will change from the first mode, indicating a weight on wheels, to the second mode, indicating that the aircraft 100 is no longer on the ground (i.e., WoW signal indicates FALSE). The aircraft 100 is therefore in the FLIGHT condition defining the LPS in the flight LPS and the minimum gas generator idle condition as flight idle. The flight idle condition defines a minimum gas generator idle condition greater than the ground idle condition sufficient to ramp up or accelerate the gas generator 100 output speed or thrust to TAKEOFF within a prescribed period of time. For example, when aborting a transition from FLIGHT condition to LANDING condition, the operator may be required to transition from flight idle to TAKEOFF within the prescribed period of time to increase speed and/or altitude of the aircraft 100 following the aborted landing.

The transition from FLIGHT condition to LANDING condition generally occurs when the sensor 244 indicating a weight on wheels changes from the second mode (i.e., FALSE) to the first mode (i.e., TRUE), indicating that the aircraft 100 has touched ground and the wheels at least partially support the weight of the aircraft 100 on the ground. The transition from FLIGHT condition to LANDING condition is further defined by an elapsed period of time at which the sensor 244 is in the first mode following the second mode (e.g., an elapsed time from which the weight on wheels sensor changed from FALSE to TRUE). The transition from FLIGHT condition to LANDING condition is still further defined by the throttle lever position being below or less than the TAKEOFF setting.

The LANDING condition is defined by the LPS in the ground LPS and the minimum gas generator idle condition defining the flight idle condition. The higher flight idle condition of the gas generator enables relatively quick transitions back to TAKEOFF and the FLIGHT condition if the landing is aborted. The lower ground LPS enables lower propeller speeds to enable landing and taxi of the aircraft 100 following successful landing. However, if the landing is aborted and the sensor 244 no longer reads the second mode (i.e., the WoW signal returns to FALSE indicating the aircraft 100 is no longer on the ground), or if the throttle lever position returns to TAKEOFF for at least an elapsed period of time, then the aircraft 100 transitions from the LANDING condition to the FLIGHT condition.

When the aircraft 100 is in the LANDING condition for an elapsed period of time, or when the throttle lever position changes to below or less than IDLE position, the aircraft 100 transitions from the LANDING condition to the GROUND condition.

Figure 8:
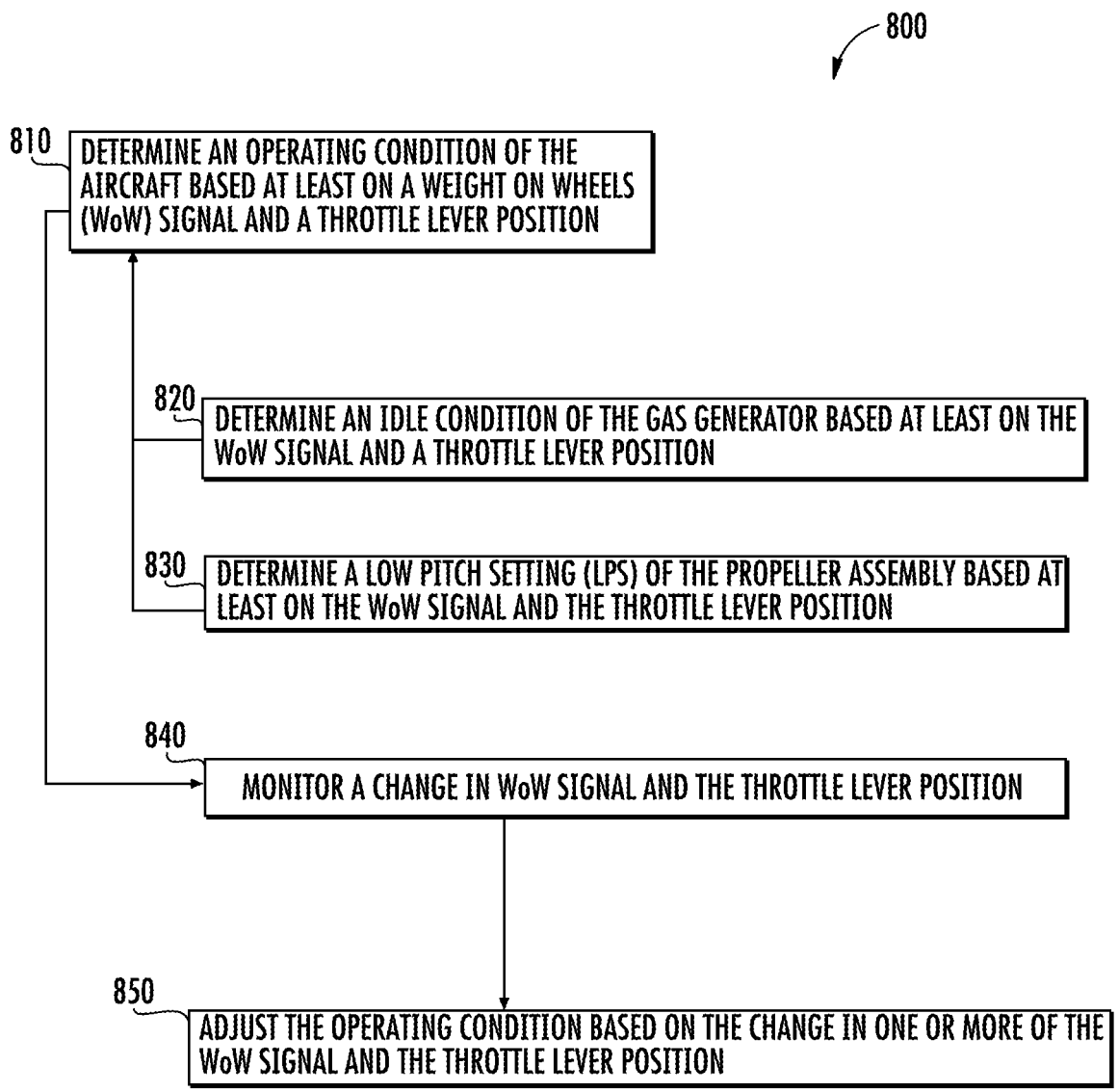
FIG. 8 illustrates an exemplary flowchart outlining steps of a method of determining an aircraft minimum low pitch setting and a minimum gas generator idle speed or power output according to an embodiment of the present disclosure.
Figure 9:
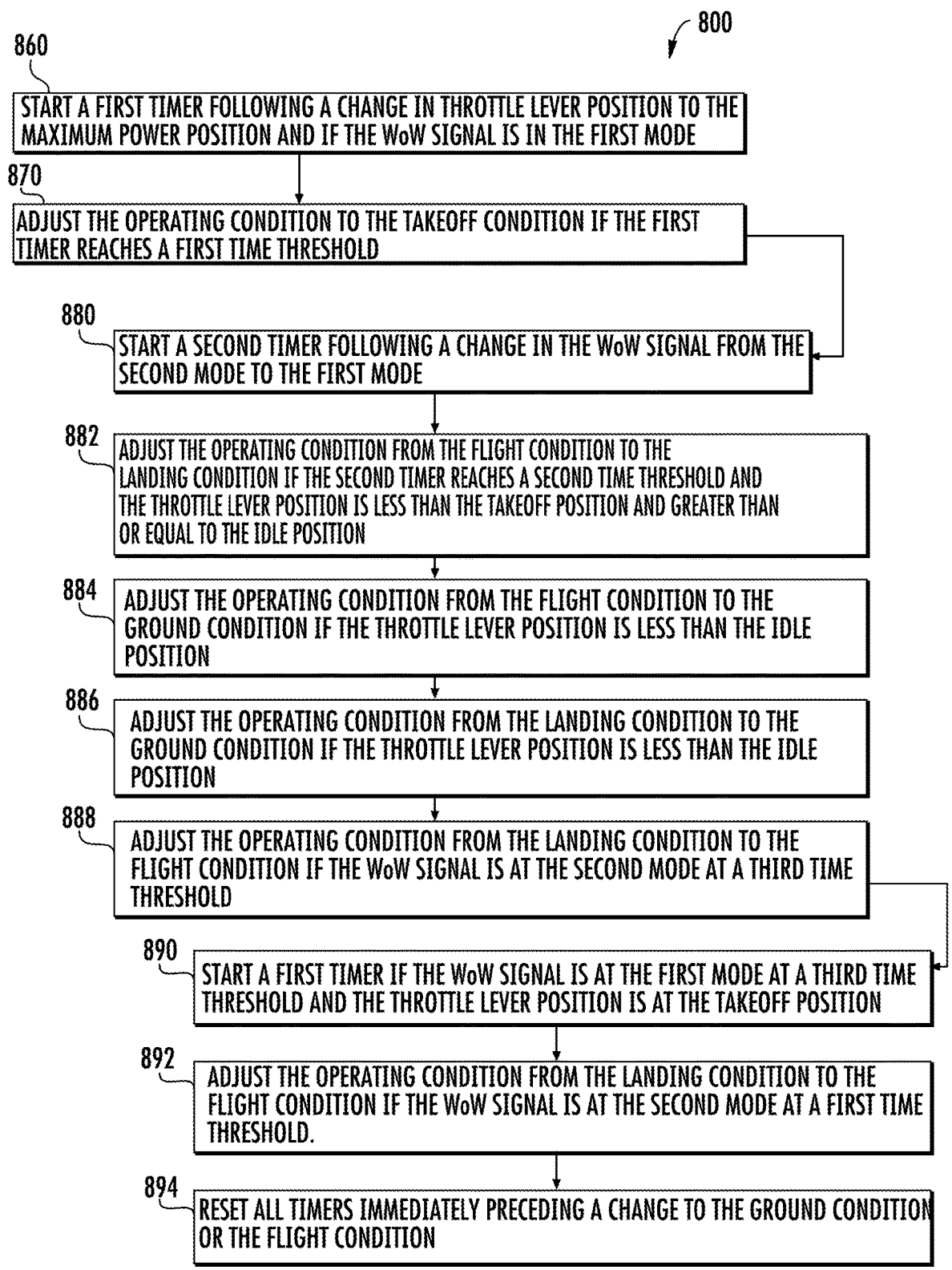
FIG. 9 illustrates another exemplary flowchart outlining steps of the method generally outlined in FIG. 8 in accordance to an embodiment of the present disclosure.

Referring now to FIGS. 8-9, exemplary flowcharts of a method of determining an aircraft minimum low pitch setting and a minimum gas generator idle speed (hereinafter, "method 800") is generally provided. The method 800 may be implemented by the control logic 216 of the controller 210, the system 200, and aircraft 10 including the gas generator 100 and the propeller assembly 30 as shown and described in regard to FIGS. 1-7.

The method 800 includes at 810 determining, via one or more controllers, an operating condition of the aircraft based at least on a weight on wheels (WoW) signal and a throttle lever position. As previously described, the WoW signal (e.g., sensor 244) produces a first mode (e.g., TRUE) or a second mode (e.g., FALSE) different from the first mode, and the throttle lever position defines at least a takeoff position and an idle power position. In various embodiments, the method 800 further includes determining the operating condition of the aircraft at 820 by determining, via one or more controllers, an idle condition of the gas generator based at least on the WoW signal and a throttle lever position and at 830 determining, via one or more controllers, a low pitch setting (LPS) of the propeller assembly based at least on the WoW signal and the throttle lever position.

In various embodiments at 820, determining an idle condition of the gas generator includes setting a ground idle condition or a flight idle condition of the gas generator based at least on the WoW signal and the throttle lever position. In one embodiment at 820, in determining the idle condition of the gas generator, the ground idle condition is set when the WoW signal produces the first mode and the throttle lever position is below the idle power position. In another embodiment at 820, in determining the idle condition of the gas generator, the flight idle condition is set when the WoW signal produces the second mode.

In still various embodiments at 830, determining a LPS of the propeller assembly includes setting a ground LPS or a flight LPS based at least on the WoW signal and the throttle lever position. In one embodiment, in determining the LPS of the propeller assembly, the ground LPS is set when the WoW signal produces the first mode. In another embodiment, in determining the LPS of the propeller assembly, the flight LPS is set when the WoW signal produces the second mode.

In still yet various embodiments at 830, in determining the LPS, the WoW signal at the first mode while the throttle lever position is greater than or equal to the idle power position and less than the takeoff position sets the LPS from a flight LPS condition to a ground LPS condition. In yet another embodiment, in determining the LPS, the throttle lever position at the takeoff position sets the LPS from a ground LPS condition to a flight LPS condition.

In another embodiment, the method 800 further includes at 840 monitoring a change in WoW signal and the throttle lever position, in which a change in WoW signal or the throttle lever position is indicative of a change in operating condition of the aircraft. For example, in reference to FIGS. 6-7 and the description associated therewith, monitoring a change in WoW signal and the throttle lever position includes monitoring a change in operating conditions based on one or both of the WoW signal and the throttle lever position. As another example, monitoring a change in WoW signal and the throttle lever position includes monitoring a change from the GROUND, TAKEOFF, FLIGHT, or LANDING conditions. Monitoring a change in the WoW signal and the throttle lever position may further include monitoring a change in one or both over an elapsed period of time.

In still various embodiments, the method 800 further includes at 850 adjusting the operating condition based on the change in one or more of the WoW signal and the throttle lever position, such as described in regard to FIG. 6. In one embodiment, adjusting the operating condition includes adjusting the minimum pitch angle to the flight LPS (e.g., a first minimum pitch angle) or the ground LPS (e.g., a second minimum pitch angle) and adjusting the minimum gas generator idle speed to the ground idle condition or the flight idle condition.

In another embodiment, the method 800 further includes (as shown in FIG. 9) at 860 starting a first timer following a change in throttle lever position to the TAKEOFF position and if the WoW signal is in the first mode, and at 870 adjusting the operating condition to the TAKEOFF condition if the first timer reaches a first time threshold. Referring to FIG. 7, the first timer may be depicted as $t_1$ timer and further referred to herein as the period of elapsed time following a change in operating condition, such as a change in WoW signal to the first mode or the second mode, or a change in throttle lever position to TAKEOFF or less, or IDLE position or less. The first time threshold, second time threshold, third time threshold, etc. as described herein may define a period of time necessary to ensure a command is intentional (e.g., incorporating a delay to ensure a command to TAKEOFF is actually desired rather than unintentional). However, it should be appreciated that each time threshold may be minimal or zero and may be dependent at least on the type, function, usage, mission, etc. of the aircraft 100.

In still another embodiment, such as in reference to FIG. 7, the method 800 further includes at 880 starting a second timer (e.g., depicted as $t_2$ timer in FIG. 7) following a change in the WoW signal from the second mode to the first mode; at 882 adjusting the operating condition from the FLIGHT condition to the LANDING condition if the second timer reaches a second time threshold and the throttle lever position is less than the TAKEOFF position and greater than or equal to the IDLE position; and at 884 adjusting the operating condition from the FLIGHT condition to the GROUND condition if the throttle lever position is less than the IDLE position.

In yet various other embodiments, the method 800 further includes at 886 adjusting the operating condition from the LANDING condition to the GROUND condition if the throttle lever position is less than the IDLE position; and at 888 adjusting the operating condition from the LANDING condition to the FLIGHT condition if the WoW signal is at the second mode at a third time threshold.

In another embodiment, the method 800 further includes at 890 starting a first timer if the WoW signal is at the first mode at a third time threshold and the throttle lever position is at the TAKEOFF position; and at 892 adjusting the operating condition from the LANDING condition to the FLIGHT condition if the WoW signal is at the second mode at a first time threshold.

Still further, the method 800 may include at 894 resetting all timers preceding a change to the ground condition or the flight condition. For example, resetting all timers includes resetting the first timer $t_1$ and the second timer $t_2$ to zero. As another example, resetting all timers includes resetting all timers immediately preceding a change to the ground condition or the flight condition.

Referring back to FIG. 4, it should be appreciated that the sensor 244 can be communicatively coupled to the controller 210 via any suitable wired or wireless connection. As such, in one example embodiment, the controller 210 can receive a signal from the sensor 244 indicating whether the aircraft 10 is operating in the FLIGHT, TAKEOFF, GROUND or LANDING conditions.

The system 200 of FIG. 4 can include a pitch change actuator 250 comprising a coarse pitch chamber 252 and a fine pitch chamber 254. A fluid (e.g., hydraulic fluid, engine oil, etc.) can be directed into or out of the coarse pitch chamber 252 to simultaneously increase the pitch angle θ of each blade of the plurality of blades 34. In contrast, the fluid can be directed into or out of the fine pitch chamber 254 to simultaneously decrease the pitch angle θ of each blade of the plurality of blades 34.

The system 200 can also include a propeller control unit 260 that is communicatively coupled to the controller 210. As shown, the propeller control unit 260 can include a primary pitch control valve 262 and a propeller overspeed control valve 264. In operation, the propeller control unit 260 can receive one or more commands from the controller 210 to adjust the pitch angle θ of the blades 34 via the primary pitch control valve 262. In one example embodiment, the propeller control unit 260 can operate the primary pitch control valve 262 to direct the fluid into or out of the fine pitch chamber 254. Alternatively, or in addition to, the propeller control unit 260 can operate the primary pitch control valve 262 to direct the fluid into or out of the coarse pitch chamber 252.

It should be appreciated that the primary pitch control valve 262 can be used to adjust the pitch angle θ of each blade of the plurality of blades 34 when the rotational speed of the propeller assembly 30 is operating at a normal operating condition. For example, the primary pitch control valve 262 can adjust the pitch angle θ of the blades 34 from one or the other of the ground LPS defining the first minimum pitch angle θ or the flight LPS defining the second minimum pitch angle θ up to a maximum defined rotational speed of the propeller assembly 30.

Figure 10:
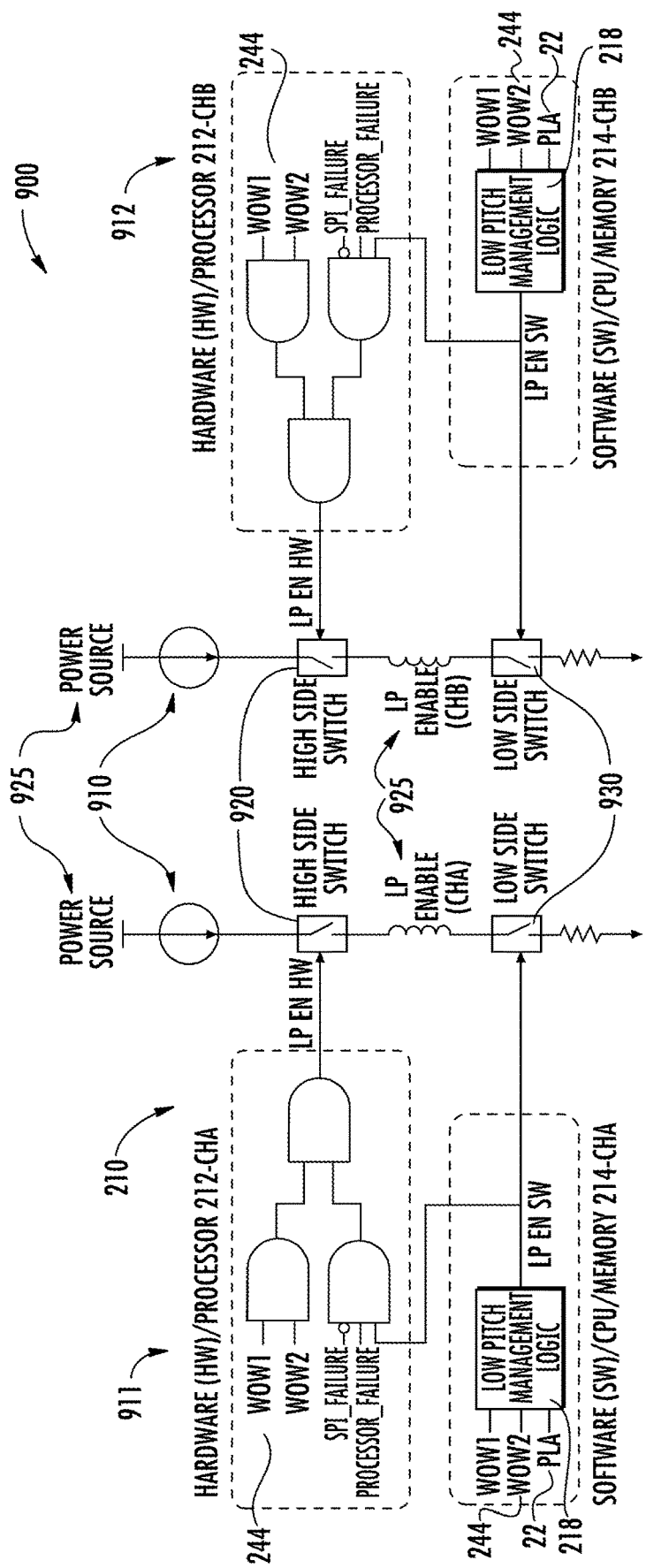
FIG. 10 illustrates an exemplary schematic of a system for determining and applying a low pitch setting (LPS) for a propeller assembly.

Referring now to FIG. 10, an embodiment of the system 200 configured as a system 900 for determining and applying a low pitch setting (LPS) for a propeller assembly (e.g., propeller assembly 30 in FIG. 1) based on the operating conditions and flowcharts described in regard to FIGS. 1-8 is generally provided. The system 900 is depicted as a dual-channel system and generally depicts a hardware and software implementation of the systems, flowcharts, and methods generally provided in FIGS. 1-8. In various embodiments, the system 900 may define a dual channel controller 210 (e.g., a FADEC) commanding a dual channel valve (e.g., an electro-hydraulic valve) controlling the low pitch setting of the propeller assembly 30. More specifically, excitation of the one or more channels 910 enables a hydraulic lock of the propeller assembly 30, thereby preventing operation of the propeller assembly 30 below the second minimum pitch angle θ defining the flight LPS setting. In other words, a valve controlling the LPS of the propeller assembly 30 may default to the flight LPS unless a signal is communicated to enable operation at a first minimum pitch angle θ less than the flight LPS defining the second minimum pitch angle θ (i.e., disengage the hydraulic lock).

When at least one of the channels (e.g., channel A or "CHA" 911, channel B or "CHB" 912) is excited, the hydraulic lock is removed, thereby enabling operation below the second minimum pitch angle θ defining the flight LPS (i.e., to the first minimum pitch angle θ or ground LPS). As described in regard to FIGS. 1-8, the low pitch management logic 218 receives a weight on wheels (WoW) signal from one or more sensor 244 (although two WoW signals are shown in FIG. 10, in other embodiments one or more signals may be communicated to the low pitch management logic 218). The low pitch management logic 218 further receives a throttle lever position (e.g., power lever angle or PLA). The low pitch management logic 218 determines whether to set the low pitch enable 925 (LP ENABLE) to TRUE based on the GROUND condition or the LANDING condition such as described in regard to FIGS. 1-8. When the LP ENABLE 925 is TRUE, a low side switch 930 is closed.

Furthermore, to disengage the hydraulic lock, both the high side switch 920 and the low side switch 930 each must be closed. The high side switch 920 may be closed via hardware, such as, but not limited to, a processor 214 such as further described herein. The high side switch 920 may be configured independent of the controller 210, or independent of one or more of the processors 212 and memory 214. The high side switch 920 is closed when each of the WoW signals are TRUE; when the LP ENABLE 925 is TRUE; and when no faults are present in the processors 212 (e.g., if a serial peripheral interface or SPI_failure signal is TRUE; if a processor failure is TRUE).

The high side switch 920 generally ensures that in the FLIGHT condition or generally when at least one WoW signal is in the second mode (i.e., FALSE, indicating no weight on wheels) the hydraulic lock is engaged, thereby opening the high side switch 920 and disabling operation at the first minimum pitch angle θ defining the ground LPS and enabling operation at the second minimum pitch angle θ defining the flight LPS. The hydraulic lock is further engaged when there is a fault in the processor(s) 212. In other words, the high side switch 920 may generally invalidate a command from the low pitch management logic 218 disengaging the hydraulic lock (thereby enabling the ground LPS) if one or more faults is present or if one or more WoW signals indicates a FLIGHT condition. As such, the high side switch 920 may generally provide a default low pitch setting at the flight LPS condition.

Figure 11:
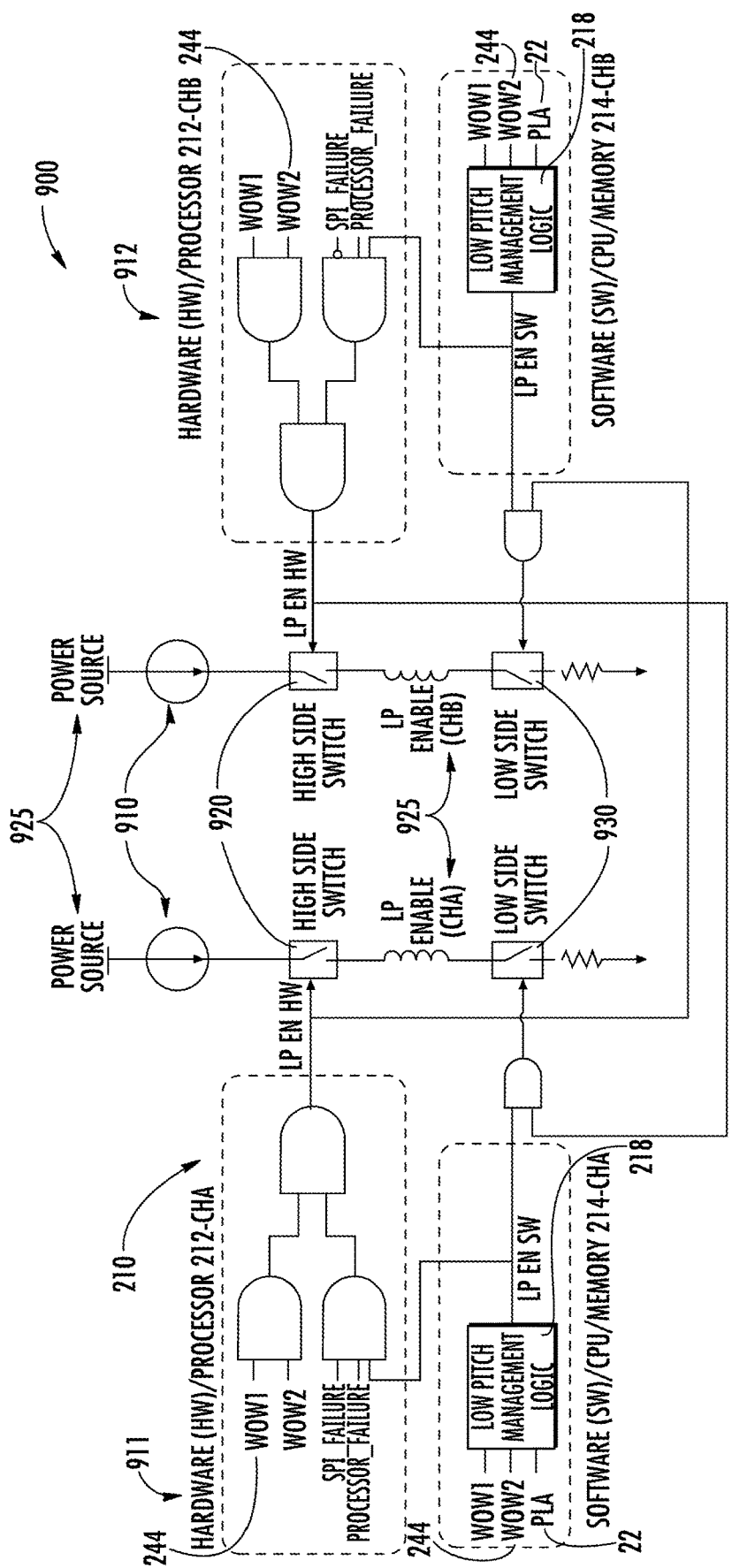
FIG. 11 illustrates another exemplary schematic of a system for determining and applying a low pitch setting (LPS) for a propeller assembly.

Referring now to FIG. 11, an embodiment of the system 900 shown in FIG. 10 is generally provided in which the system 900 is configured with cross channel communication. As such, the low side switch 930 requires confirmation from the cross-channel (i.e., CHA 911 requires confirmation from CHB 912; CHB 912 requires confirmation from CHA 911). Therefore, to close the low side switch 930, the LP ENABLE from the low pitch management logic 218 at a first channel (e.g., CHA 911) must indicate TRUE in addition to the high side switch 920 from the other channel (e.g., CHB 912) indicating TRUE. Similarly, the LP ENABLE at the low pitch management logic 218 at a second channel (e.g., CHB 912) must indicate TRUE in addition to the high side switch 920 from the other channel (e.g., CHA 911) indicating TRUE to close the low side switch. As such, the embodiment generally provided in FIG. 11 requires agreement from each channel before energizing (i.e., disengaging) the hydraulic lock to enable the ground LPS condition. As shown schematically, a power source 915 provides or modulates an input energy to disengage or disengage a high side switch 920, a low side switch 930, and a low pitch enable (LP ENABLE) device 925.

Although the present disclosure describes the sensor 244 as a weight on wheels (WoW) sensor, it should be appreciated that any sensor or system determining whether an aircraft is on the ground or off of the ground may be applicable. Furthermore, although the present disclosure describes certain combinations of hardware or software to engage or disengage a hydraulic lock of the propeller assembly 30, it should be appreciated that other failsafe, single-channel, dual-channel, or other multi-channel hardware or software configurations may be employed without deviating from the scope of the present disclosure. Still further, although generally provided as a fixed-wing aircraft, the present disclosure may further apply to rotary-wing aircraft, tilt-rotor aircraft, or other apparatuses including a pitch-changing propeller assembly and a gas generator coupled to an aircraft.

This written description uses examples to disclose the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for setting an aircraft minimum pitch angle and minimum gas generator idle speed, the system comprising one or more controllers comprising one or more processors and one or more memory devices, the one or more memory devices storing instructions that when executed by the one or more processors cause the one or more processors to perform operations, the operations comprising:

receiving, via one or more sensors providing a weight on wheels (WoW) signal, the weight on wheels (WoW) signal defining a first mode corresponding to an aircraft being on a ground and a second mode different from the first mode;

receiving, via an operator manipulated input device, a throttle lever position defining at least an idle position and a takeoff position; and determining, via one or more controllers, an operating condition of the aircraft based at least on the WoW signal and the throttle lever position, wherein each operating condition defines a low pitch setting (LPS) of a propeller assembly and an idle condition of a gas generator, wherein the operating condition defines:
   a ground condition defining a ground LPS and a ground idle condition,
   a takeoff condition defining a flight LPS and the ground idle condition,
   a flight condition defining the flight LPS and the flight idle condition, and
   a landing condition defining the ground LPS and the flight idle condition, wherein the operations further comprise:
   monitoring, via one or more sensors, a change in the WoW signal and a change in the throttle lever position;
   adjusting the operating condition based on the change in one or more of the WoW signal and the throttle lever position;
   starting a second timer following a change in the WoW signal from the second mode to the first mode; and
   adjusting the operating condition from the flight condition to the landing condition defined by the ground LPS and the flight idle condition if the second timer reaches a second time threshold and the throttle lever position is less than the takeoff position and greater than or equal to an idle power position.

2. The system of claim 1, the operations further comprising:
   starting a first timer following a change in the throttle lever position to the takeoff position and if the WoW signal is in the first mode; and
   adjusting the operating condition to the takeoff condition if the first timer reaches a first time threshold.

3. The system of claim 1, the operations further comprising:
   resetting all timers preceding a change to the ground condition or the flight condition.

4. The system of claim 1, wherein adjusting the operating condition includes adjusting the minimum pitch angle to the flight LPS or the ground LPS and adjusting the minimum gas generator idle speed to the ground idle condition or the flight idle condition.

5. The system of claim 4, wherein the flight LPS defines a minimum pitch angle greater than the minimum pitch angle of the ground LPS, and wherein the flight idle condition defines a minimum gas generator idle speed greater than the minimum gas generator idle speed of the ground idle condition.

6. A system for setting an aircraft minimum pitch angle and minimum gas generator idle speed, the system comprising one or more controllers comprising one or more processors and one or more memory devices, the one or more memory devices storing instructions that when executed by the one or more processors cause the one or more processors to perform operations, the operations comprising:

receiving, via one or more sensors providing a weight on wheels (WoW) signal, the weight on wheels (WoW) signal defining a first mode and a second mode different from the first mode;

receiving, via an operator manipulated input device, a throttle lever position defining at least an idle position and a takeoff position; and determining, via one or more controllers, an operating condition of the aircraft based at least on the WoW signal and the throttle lever position, wherein each operating condition defines a low pitch setting (LPS) of a propeller assembly and an idle condition of a gas generator, wherein the operating condition defines:
   a ground condition defining a ground LPS and a ground idle condition,
   a takeoff condition defining a flight LPS and the ground idle condition,
   a flight condition defining the flight LPS and the flight idle condition, and
   a landing condition defining the ground LPS and the flight idle condition, wherein the operations further comprise:
   monitoring, via one or more sensors, a change in the WoW signal and a change in the throttle lever position;
   adjusting the operating condition based on the change in one or more of the WoW signal and the throttle lever position;
   starting a second timer following a change in the WoW signal from the second mode to the first mode;
   adjusting the operating condition from the flight condition to the landing condition if the second timer reaches a second time threshold and the throttle lever position is less than the takeoff position and greater than or equal to an idle power position;
   adjusting the operating condition from the landing condition to the ground condition if the throttle lever position is less than the idle power position; and
   adjusting the operating condition from the landing condition to the flight condition if the WoW signal is at the second mode at a third time threshold.

7. The system of claim 6, the operations further comprising:
   starting a first timer if the WoW signal is at the first mode at a third time threshold and the throttle lever position is at the takeoff position; and
   adjusting the operating condition from the landing condition to the flight condition if the WoW signal is at the second mode at a first time threshold.

8. A method for determining an aircraft minimum low pitch setting for a propeller assembly and minimum gas generator idle speed for a gas generator, the propeller assembly and the gas generator together comprising a gas turbine engine, the method comprising:

determining, via one or more controllers, an operating condition of an aircraft based at least on a weight on wheels (WoW) signal and a throttle lever position, wherein the WoW signal produces a first mode corresponding to the aircraft being on a ground or a second mode different from the first mode, and the throttle lever position defines at least a takeoff position and an idle power position, wherein each operating condition defines a low pitch setting (LPS) of a propeller assembly and an idle condition of a gas generator, wherein the operating condition defines:
  a ground condition defining a ground LPS and a ground idle condition,
  a takeoff condition defining a flight LPS and the ground idle condition,
  a flight condition defining the flight LPS and the flight idle condition, and
  a landing condition defining the ground LPS and the flight idle condition, wherein the method further comprises:
  monitoring, via one or more sensors, a change in the WoW signal and a change in the throttle lever position;
  adjusting the operating condition based on the change in one or more of the WoW signal and the throttle lever position;
  starting a second timer following a change in the WoW signal from the second mode to the first mode;
  adjusting the operating condition from the flight condition to the landing condition defined by the ground LPS and the flight idle condition if the second timer reaches a second time threshold and the throttle lever position is less than the takeoff position and greater than or equal to an idle power position.

9. The method of claim 8, wherein determining the operating condition comprises;

determining, via one or more controllers, the idle condition of the gas generator based at least on the WoW signal and the throttle lever position; and
  determining, via one or more controllers, the LPS of the propeller assembly based at least on the WoW signal and the throttle lever position.

10. The method of claim 9, wherein determining the idle condition of the gas generator includes setting the ground idle condition or the flight idle condition of the gas generator based at least on the WoW signal and the throttle lever position.

11. The method of claim 10, wherein in determining the idle condition of the gas generator, the ground idle condition is set when the WoW signal produces the first mode and the throttle lever position is below the idle power position.

12. The method of claim 10, wherein in determining the idle condition of the gas generator, the flight idle condition is set when the WoW signal produces the second mode.

13. The method of claim 9, wherein determining a LPS of the propeller assembly includes setting a ground LPS or a flight LPS based at least on the WoW signal and the throttle lever position.

14. The method of claim 13, wherein in determining the LPS of the propeller assembly, the ground LPS is set when the WoW signal produces the first mode.

15. The method of claim 13, wherein in determining the LPS of the propeller assembly, the flight LPS is set when the WoW signal produces the second mode.

16. The method of claim 9, wherein in determining the LPS, the WoW signal at the first mode while the throttle lever position is greater than or equal to the idle power position and less than the takeoff position sets the LPS from a flight LPS condition to a ground LPS condition.

17. The method of claim 9, wherein in determining the LPS, the throttle lever position at the takeoff position sets the LPS from a ground LPS condition to a flight LPS condition.

* * * * *